United States Patent
Takahashi et al.

(10) Patent No.: US 9,935,337 B2
(45) Date of Patent: Apr. 3, 2018

(54) LITHIUM SECONDARY BATTERY

(71) Applicant: NEC Corporation, Tokyo (JP)

(72) Inventors: Makiko Takahashi, Tokyo (JP);
Takehiro Noguchi, Tokyo (JP);
Hideaki Sasaki, Tokyo (JP); Yuukou Katou, Tokyo (JP)

(73) Assignee: NEC Corporation, Tokyo (JP)

( * ) Notice: Subject to any disclaimer, the term of this patent is extended or adjusted under 35 U.S.C. 154(b) by 489 days.

(21) Appl. No.: 14/414,985

(22) PCT Filed: Jul. 1, 2013

(86) PCT No.: PCT/JP2013/068038
§ 371 (c)(1),
(2) Date: Jan. 15, 2015

(87) PCT Pub. No.: WO2014/013858
PCT Pub. Date: Jan. 23, 2014

(65) Prior Publication Data
US 2015/0171477 A1   Jun. 18, 2015

(30) Foreign Application Priority Data
Jul. 17, 2012   (JP) .................. 2012-159122

(51) Int. Cl.
*H01M 10/0567* (2010.01)
*H01M 10/0569* (2010.01)
*H01M 4/505* (2010.01)
*H01M 4/525* (2010.01)
*H01M 10/052* (2010.01)
*H01M 4/58* (2010.01)
*H01M 4/02* (2006.01)

(52) U.S. Cl.
CPC ....... *H01M 10/0569* (2013.01); *H01M 4/505* (2013.01); *H01M 4/525* (2013.01); *H01M 4/5825* (2013.01); *H01M 10/052* (2013.01); *H01M 10/0567* (2013.01); *H01M 2004/028* (2013.01); *H01M 2300/004* (2013.01); *H01M 2300/0025* (2013.01); *H01M 2300/0034* (2013.01); *H01M 2300/0037* (2013.01); *H01M 2300/0042* (2013.01)

(58) Field of Classification Search
CPC ......... H01M 10/0567; H01M 10/0569; H01M 10/052; H01M 4/505; H01M 4/525; H01M 4/5825; H01M 2004/028; H01M 2300/0034; H01M 2300/0037; H01M 2300/004; H01M 2300/0042; H01M 2300/0025
See application file for complete search history.

(56) References Cited

FOREIGN PATENT DOCUMENTS

| CN | 101442141 A | 5/2009 |
|----|-------------|--------|
| CN | 102420340 A | 4/2012 |
| EP | 2 535 975 A1 | 12/2012 |
| JP | 10-255839 | 9/1998 |

(Continued)

OTHER PUBLICATIONS

Office Action issued by the Chinese Patent Office in counterpart European Patent Application No. 201380038435.9, dated Apr. 1, 2016.

(Continued)

*Primary Examiner* — Laura Weiner
(74) *Attorney, Agent, or Firm* — Finnegan, Henderson, Farabow, Garrett & Dunner, L.L.P.

(57) ABSTRACT

The present invention relates to a lithium secondary battery, comprising
a positive electrode;
a negative electrode; and
a non-aqueous electrolyte solution,
wherein the non-aqueous electrolyte solution contains
a phosphate polymer represented by the following formula (1):

$$R_2-O-\overset{\overset{\displaystyle R_3}{\overset{\displaystyle |}{\overset{\displaystyle O}{|}}}}{\underset{\underset{\displaystyle O}{\|}}{P}}-(O-R_1-O-\overset{\overset{\displaystyle R_4}{\overset{\displaystyle |}{\overset{\displaystyle O}{|}}}}{\underset{\underset{\displaystyle O}{\|}}{P}})_n-O-R_5 \quad (1)$$

wherein $R_1$ to $R_5$ each independently represents aliphatic hydrocarbon group or fluorinated aliphatic hydrocarbon group, wherein the group may have a substituent, and n represents an integer of 1 or more, with the proviso that when n is 2 or more, two or more $R_1(s)$ may be the same as, or different from each other and two or more $R_4(s)$ may be the same as, or different from each other; and
a fluorinated phosphate represented by the following formula (2):

$$R_6-O-\overset{\overset{\displaystyle R_7}{\overset{\displaystyle |}{\overset{\displaystyle O}{|}}}}{\underset{\underset{\displaystyle O}{\|}}{P}}-O-R_8 \quad (2)$$

wherein $R_6$ to $R_8$ each independently represents aliphatic hydrocarbon group or fluorinated aliphatic hydrocarbon group, wherein the group may have a substituent, with the proviso that at least one of $R_6$ to $R_8$ is fluorinated aliphatic hydrocarbon group.

12 Claims, 1 Drawing Sheet

(56) References Cited

FOREIGN PATENT DOCUMENTS

| | | |
|---|---|---|
| JP | 11-273731 | 10/1999 |
| JP | 2000-215911 | 8/2000 |
| JP | 2002-203597 | 7/2002 |
| JP | 3821495 | 9/2006 |
| JP | 2008-21560 | 1/2008 |
| JP | 2011-44245 | 3/2011 |
| JP | 2012-18801 | 1/2012 |
| JP | 2012-94491 | 5/2012 |
| WO | WO 2011/099580 | 8/2011 |
| WO | WO 2012/077712 A1 | 6/2012 |

OTHER PUBLICATIONS

Extended European Search Report issued by the European Patent Office in counterpart European Patent Application No. 13820673.5, dated Mar. 1, 2016.

International Search Report dated Oct. 1, 2013 in PCT/JP2013/068038.

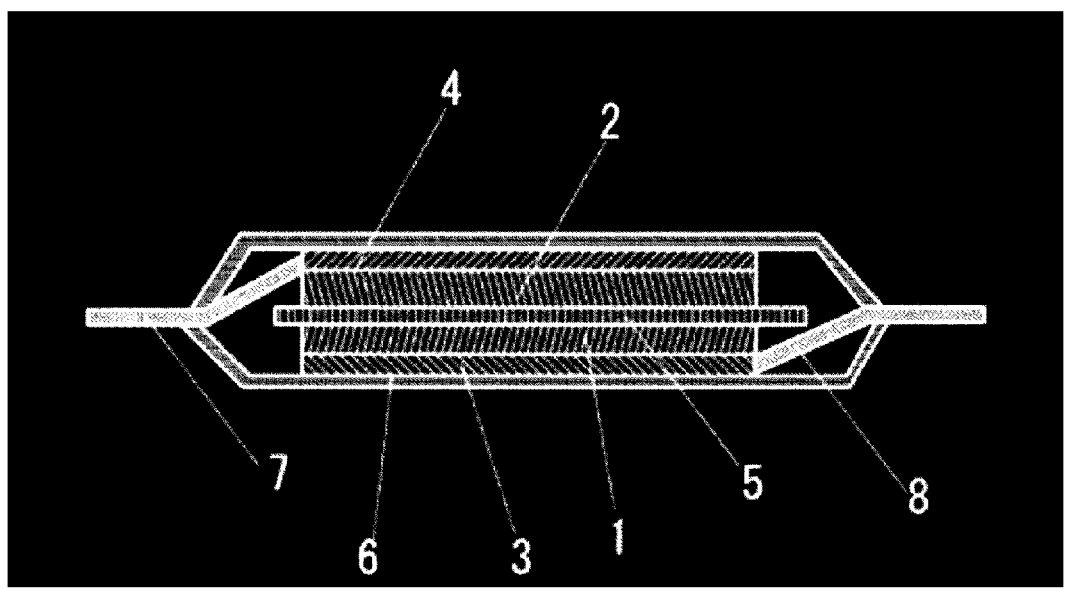

LITHIUM SECONDARY BATTERY

CROSS-REFERENCE TO RELATED PATENT APPLICATIONS

This application is a National Stage Entry of International Application No. PCT/JP2013/068038, filed Jul. 1, 2013, which claims priority from Japanese Patent Application No. 2012-159122, filed Jul. 17, 2012. The entire contents of the above-referenced applications are expressly incorporated herein by reference.

TECHNICAL FIELD

The present invention relates to a lithium secondary battery.

BACKGROUND ART

A lithium secondary battery is characterized in that it is small and has a large capacity, and has been widely used as a power source for electronic device such as cellular phone and notebook computer, and has contributed to the improvement in the convenience of portable IT devices. In recent years, attention is also focused on the use of a lithium secondary battery for applications where the battery is larger, including a power source to drive a two-wheeled vehicle, an automobile, or the like, and a storage battery for smart grid.

For a lithium secondary battery, high safety in a wide range of temperature conditions is required in addition to further improvement in energy density and lifetime property wherein the battery can endure long term use. Accordingly, studies have been widely conducted on various materials and additives with respect to the composition of the electrolyte solution, which has a great influence on the long-term cycle and the safety.

In general, a carbonate-based non-aqueous solvent is used for an electrolyte solution in a lithium secondary battery. That is because the carbonate-based solvent has excellent electrochemical resistance and is inexpensive in terms of cost. As an electrolyte solution of a carbonate-based solvent, a mixed electrolyte solution containing a cyclic carbonate such as ethylene carbonate (EC) and propylene carbonate (PC) and a chain carbonate such as diethyl carbonate (DEC) and dimethyl carbonate (DMC) is usually used. The cyclic carbonate has a high dielectric constant, and therefore has a function of dissolving/dissociating a lithium salt such as $LiPF_6$. The chain carbonate has a low viscosity, and therefore has a function of improving the diffusibility of lithium ion in the electrolyte solution.

Because the carbonate-based solvents have low flash points and high combustibility, however, there is a risk of ignition/explosion caused by overcharge or overheating. The danger is greater in the case of ignition or explosion as the battery is larger, and therefore the improvement in safety is an important problem for a large-sized battery, in particular. In addition, during long-term cycle or under high-temperature conditions, the decomposition of the solvent of the electrolyte solution, as well as the deterioration of electrodes, may occur, resulting in the reduction in the capacity, the generation of gas, and the like. The problems tend to be recognized markedly in a lithium secondary battery comprising a positive electrode for high voltage which comprises a spinel compound such as $LiNi_{0.5}Mn_{1.5}O_4$ as a positive electrode active material, in particular, the battery attracting attention as to higher energy density in recent years.

As a method for solving the problems, Patent Literatures 1 to 2 disclose that an electrolyte solution containing a solvent which contains a fluorinated phosphate, and an electrolyte ($LiPF_6$, and the like) is used. The fluorinated phosphate has a self-extinguishing function, and the electrolyte solution to which the fluorinated phosphate is added is expected to be a flame-retardant electrolyte solution. Additionally, Patent Literature 1 discloses that the battery performance may be enhanced by changing the solvent to a mixed solvent of a fluorinated phosphate, and a chain ester and/or a cyclic ester. Patent Literature 2 discloses that it is further preferred that a cyclic carbonate and a chain carbonate are mixed into the solvent as the solvent of the electrolyte solution.

In addition, Patent Literature 3 discloses that charge and discharge properties of the battery is improved by adding a vinylene carbonate compound and/or a vinyl ethylene carbonate compound to a phosphate-based electrolyte solution.

Patent Literature 4 discloses that when a fluorinated phosphate and a specific fluorine-containing solvent such as a fluorinated ether are mixed and used, the non-aqueous electrolyte solution exhibits high flame-retardant properties, and has high electrolyte-dissolving properties, and exhibits good ionic conductivity.

Meanwhile, Patent Literature 5 discloses a non-aqueous electrolyte solution secondary battery comprising an electrolyte solution which contains a polymeric phosphate having two or more phosphate groups in the molecule, together with a chain phosphate such as trimethyl phosphate, and teaches that the secondary battery has good load properties and high safety. The polymeric phosphate is used herein as an additive solvent to form a film having high lithium ion permeability on the surface of the negative electrode and thereby improve the load properties.

CITATION LIST

Patent Literature

Patent Literature 1: Japanese Patent No. 3821495
Patent Literature 2: Japanese Patent Laid-Open No. 2008-021560
Patent Literature 3: Japanese Patent Laid-Open No. 2002-203597
Patent Literature 4: Japanese Patent Laid-Open No. 2012-094491
Patent Literature 5: Japanese Patent Laid-Open No. H11-273731

SUMMARY OF INVENTION

Technical Problem

It has been known that an electrolyte solution containing a fluorinated phosphate is flame-retardant and has a high resistance to oxidation. However, when a positive electrode active material which operates at a high electric potential is used, sometimes the decomposition reaction of the electrolyte solution occurs at a contact part of the positive electrode and the electrolyte solution, and then the product of the decomposition at the positive electrode is reduced at the negative electrode, which causes the problems such as the generation of gas and the deterioration in charge and discharge cycle characteristic. In a lithium secondary battery comprising a positive electrode active material which exhibits a high electric potential of 4.5 V or more, in particular, the decomposition of the electrolyte solution readily occurs at the positive electrode, and therefore the further improvement in cycle characteristic at a high temperature of 45° C. or more, for example, is desired.

The object of one embodiment of the invention is to provide a non-aqueous secondary battery wherein the decomposition of the electrolyte solution is effectively suppressed even under high-voltage and high-temperature conditions, and therefore the battery has excellent long-term cycle characteristic.

Solution to Problem

An embodiment of the invention relates to a lithium secondary battery comprising a positive electrode, a negative electrode and a non-aqueous electrolyte solution, wherein the non-aqueous electrolyte solution contains a phosphate polymer represented by the following formula (1) and a fluorinated phosphate represented by the following formula (2).

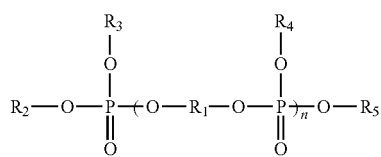

wherein $R_1$ to $R_5$ each independently represents aliphatic hydrocarbon group or fluorinated aliphatic hydrocarbon group, wherein the group may have a substituent, and n represents an integer of 1 or more, with the proviso that when n is 2 or more, two or more $R_1(s)$ may be the same as, or different from each other and two or more $R_4(s)$ may be the same as, or different from each other.

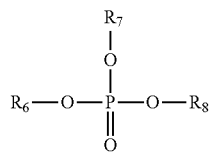

wherein $R_6$ to $R_8$ each independently represents aliphatic hydrocarbon group or fluorinated aliphatic hydrocarbon group, wherein the group may have a substituent, with the proviso that at least one of $R_6$ to $R_8$ is fluorinated aliphatic hydrocarbon group.

Advantageous Effects of Invention

According to the embodiment of the invention, there may be provided a non-aqueous secondary battery wherein the decomposition of the electrolyte solution is effectively suppressed even under high-voltage and high-temperature conditions, and therefore the battery has excellent long-term cycle characteristic.

BRIEF DESCRIPTION OF DRAWING

FIG. 1 is a sectional view illustrating an embodiment of the lithium secondary battery of the present invention.

DESCRIPTION OF EMBODIMENTS

The secondary battery of the embodiment comprises a positive electrode, a negative electrode, and a non-aqueous electrolyte solution, wherein the electrolyte solution contains a phosphate polymer represented by the formula (1) and a fluorinated phosphate represented by the formula (2).

When the fluorinated phosphate is used as a solvent of an electrolyte solution, the fluorinated phosphate is reduced and decomposes on a surface of a carbon negative electrode, and the charge and discharge properties as the battery is remarkably decreased, although the fluorinated phosphate is a solvent having a high resistance to oxidation. It has been demonstrated that the reductive decomposition on the negative electrode may be suppressed when the fluorinated phosphate is mixed with a carbonate-based solvent, and yet the decomposition cannot be completely suppressed and when a positive electrode which operates at a high electric potential is used, in particular, sometimes the decomposition product formed on the positive electrode is further reduced on the negative electrode and a problem of generating a large amount of gas arises. When the phosphate polymer represented by the formula (1) is added to an electrolyte solution containing the fluorinated phosphate, the gas generation caused by the reductive decomposition on the negative electrode of the product of the decomposition of the electrolyte solution, which is formed on the positive electrode, may be suppressed, and thereby the cycle characteristic under high temperature and high voltage may be improved. According to the embodiment, in cycles under high temperature and high voltage, in particular, the reduction in the capacity may be remedied and the gas generation may be suppressed An example of the secondary battery of the present invention will be described below with respect to each component.

[Electrolyte Solution]

The electrolyte solution of the embodiment contains a lithium salt and a non-aqueous solvent, and the non-aqueous solvent contains a phosphate polymer represented by the formula (1) and a fluorinated phosphate represented by the formula (2).

In the phosphate polymer represented by the formula (1), n is preferably 1 or more and 4 or less, more preferably 1 or 2, and n is particularly preferably 1. In other words, a phosphate dimer represented by the following formula (1-1) is preferred as the phosphate polymer represented by the formula (1).

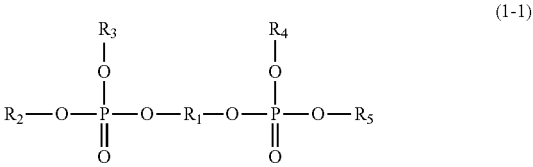

wherein $R_1$ to $R_5$ each independently represents aliphatic hydrocarbon group or fluorinated aliphatic hydrocarbon group, wherein the group may have a substituent.

In the phosphate polymer represented by the formula (1), preferably the phosphate dimer represented by the formula (1-1), $R_1$ to $R_5$ each independently represents aliphatic hydrocarbon group or fluorinated aliphatic hydrocarbon group, wherein the group may have a substituent. The fluorinated aliphatic hydrocarbon group is an aliphatic hydrocarbon group having at least one fluorine atom (that is, at least one hydrogen atom is replaced with fluorine atom).

The aliphatic hydrocarbon group may be a saturated aliphatic hydrocarbon group or an unsaturated aliphatic hydrocarbon group. The fluorinated aliphatic hydrocarbon group may also be a saturated fluorinated aliphatic hydrocarbon group or an unsaturated fluorinated aliphatic hydrocarbon group. Additionally, the aliphatic hydrocarbon group may be linear or branched. The fluorinated aliphatic hydrocarbon group may also be linear or branched.

It is preferred that each of $R_1$ to $R_5$, the aliphatic hydrocarbon group or the fluorinated aliphatic hydrocarbon group is a saturated linear or branched aliphatic hydrocarbon group, or a saturated linear or branched fluorinated aliphatic hydrocarbon group. In other words, it is preferred that $R_1$ is a linear or branched alkylene or fluorinated alkylene group, and it is preferred that each of $R_2$ to $R_5$ is a linear or branched alkyl or fluorinated alkyl group. The fluorinated alkylene group is an alkylene group having at least one fluorine atom (that is, at least one hydrogen atom is replaced with fluorine atom), and the fluorinated alkyl group is an alkyl group having at least one fluorine atom (that is, at least one hydrogen atom is replaced with fluorine atom).

In addition, the number of carbon atoms in $R_1$, the aliphatic hydrocarbon group or the fluorinated aliphatic hydrocarbon group, is preferably 1 or more and 6 or less, more preferably 1 or more and 4 or less, particularly preferably 1 or 2. The number of carbon atoms in each of $R_2$ to $R_5$, the aliphatic hydrocarbon group or the fluorinated aliphatic hydrocarbon group, each independently is preferably 1 or more and 4 or less, more preferably 1 or 2.

It is particularly preferred that $R_1$ is a linear or branched alkylene group having a number of carbon atoms of 1 or more and 6 or less, more preferably 1 or more and 4 or less, particularly preferably 1 or 2, or a linear or branched fluorinated alkylene group having a number of carbon atoms of 1 or more and 6 or less, more preferably 1 or more and 4 or less, particularly preferably 1 or 2. It is particularly preferred that each of $R_2$ to $R_5$ is a linear or branched alkyl group having a number of carbon atoms of 1 or more and 4 or less, more preferably 1 or 2, or a linear or branched fluorinated alkyl group having a number of carbon atoms of 1 or more and 4 or less, more preferably 1 or 2.

Specific and preferred examples of the $R_1$ include —$CH_2$—, —$CF_2$—, —$CH_2CH_2$—, —$CF_2CF_2$—, —$CH_2CH_2CH_2$—, —$CF_2CF_2CF_2$—, —$CH_2CF_2CH_2$—, —$CH_2CH_2CH_2CH_2$—, —$CF_2CF_2CF_2CF_2$—, —$CH_2CF_2CF_2CH_2$—, —$CH_2CF_2CF_2CF_2CH_2$—, —$CF_2CH_2CH_2CH_2CH_2CF_2$—, and —$CH_2CH_2CF_2CF_2CH_2CH_2$—.

Specific and preferred examples of the $R_2$ to $R_5$ include —$CH_3$, —$CF_3$, —$CF_2H$, —$CH_2F$, —$CH_2CH_3$, —$CH_2CF_3$, —$CH_2CF_2H$, —$CF_2CH_3$, —$CF_2CF_2H$, —$CF_2CF_3$, —$CH_2CH_2CH_3$, —$CH_2CH_2CF_3$, —$CH_2CF_2CF_3$, —$CF_2CF_2CF_3$, —$CH_2CF_2CF_2H$, —$CF_2CF_2CF_2H$, —$CF_2CF_2CH_3$, —$CH_2CH_2CH_2CH_3$, —$CH_2CH_2CH_2CF_3$, —$CF_2CF_2CF_2CF_3$, —$CF_2CF_2CF_2CH_3$, —$CF_2CF_2CF_2CF_2H$, —$CH_2CF_2CF_2CF_2H$, and —$CH_2CF_2CF_2CF_3$.

It is preferred that at least one of $R_2$ to $R_5$ is a fluorinated aliphatic hydrocarbon group, preferably a fluorinated alkyl group, and it is more preferred that two or more of $R_2$ to $R_5$ are fluorinated aliphatic hydrocarbon groups, preferably fluorinated alkyl groups.

In addition, it is preferred that at least one of, preferably two or more of $R_2$ to $R_5$ is a fluorinated aliphatic hydrocarbon group in which 50% or more, more preferably 60% or more, of hydrogen atoms contained in the corresponding unsubstituted aliphatic hydrocarbon group are replaced with fluorine atom(s). When the content of fluorine atom is high, the withstand voltage property may be further improved, and the deterioration in the capacity of the battery after the cycles may be reduced more effectively even in the case where a positive electrode active material which operates at a high electric potential is used.

Although it is preferred that each of $R_1$ to $R_5$ is an unsubstituted aliphatic hydrocarbon group or an unsubstituted fluorinated aliphatic hydrocarbon group, more preferably an unsubstituted saturated aliphatic hydrocarbon group or an unsubstituted saturated fluorinated aliphatic hydrocarbon group, $R_1$ to $R_5$ may have a substituent in addition to fluorine atom. Examples of the substituent include at least one selected from the group consisting of amino group, carboxy group, hydroxy group, cyano group, and halogen atoms (for example, chlorine atom, and bromine atom). In addition, the number of carbon atoms is the value including the substituent(s).

Specific examples of the phosphate polymer represented by the formula (1) include compounds represented by the following formulas. $(CF_3O)P(O)(OCF_3)(OCH_2O)P(O)(OCF_3)(OCF_3)$, $(CF_3CH_2O)P(O)(OCH_2CF_3)(OCH_2CH_2O)P(O)(OCH_2CF_3)(OCH_2CF_3)$, $(CF_3CH_2O)P(O)(OCH_2CF_3)(OCH_2CH_2O)P(O)(OCH_2CF_3)(OCH_3)$, $(CH_3O)P(O)(OCH_2CF_3)(OCH_2CH_2O)P(O)(OCH_2CF_3)(OCH_3)$, $(CF_3CH_2O)P(O)(OCH_2CH_3)(OCH_2CH_2O)P(O)(OCH_2CH_3)(OCH_2CF_3)$, $(CH_3CH_2O)P(O)(OCH_2CH_3)(OCH_2CH_2O)P(O)(OCH_2CH_3)(OCH_2CH_3)$, $(CF_3CF_2CH_2O)P(O)(OCH_2CF_2CF_3)(OCH_2CF_2CH_2O)P(O)(OCH_2CF_3)(OCH_2CF_3)$, $(CH_3O)P(O)(OCH_3)(OCH_2CF_2CF_2CH_2O)P(O)(OCH_3)(OCH_3)$, $(CF_2HCF_2CH_2O)P(O)(OCH_2CF_2CF_2H)(OCH_2CF_2CF_2CH_2O)P(O)(OCH_2CF_2CF_2H)(OCH_2CF_2CF_2H)$, $(CH_3CH_2O)P(O)(OCH_2CH_3)(OCF_2CH_2CH_2CH_2CH_2CF_2O)P(O)(OCH_2CH_3)(OCH_2CH_3)$, $(CH_3CH_2O)P(O)(OCH_2CH_3)(OCH_2CH_2CF_2CF_2CH_2CH_2O)P(O)(OCH_2CH_3)(OCH_2CH_3)$, and $(CF_3CH_2O)P(O)(OCH_2CF_3)(OCH_2CH_2O)P(O)(OCH_2CF_3)(OCH_2CF_3)$ The phosphate polymer represented by the formula (1) may be obtained by, for example, esterifying phosphorus oxychloride and a polyhydric alcohol having a target structure under cooling with ice. And then, the residual oxychloride group may be removed as necessary by adding a monohydric alcohol to the reaction mixture and esterifying the oxychloride group.

The content of the phosphate polymer represented by the formula (1) in the whole solvent may be preferably, but not limited to, 0.1 to 15 vol %, more preferably 0.1 to 7 vol %, further more preferably 0.5 to 5 vol %. When the content of the phosphate polymer represented by the formula (1) in the whole solvent is 0.1 vol % or more, the decomposition of the electrolyte solution is more suppressed and a good long-term cycle characteristic may be achieved. In addition, when the content of the phosphate polymer represented by the formula (1) in the whole solvent is 15 vol % or less, the increase in the viscosity of the electrolyte solution may be suppressed.

In addition, the phosphate polymer represented by the formula (1) may be used singly or in combination of two or more.

In the fluorinated phosphate represented by the formula (2), $R_6$ to $R_8$ each independently represents aliphatic hydrocarbon group or fluorinated aliphatic hydrocarbon group, wherein the group may have a substituent, with the proviso that at least one of $R_6$ to $R_8$ is fluorinated aliphatic hydrocarbon group.

The aliphatic hydrocarbon group may be a saturated aliphatic hydrocarbon group or an unsaturated aliphatic hydrocarbon group. The fluorinated aliphatic hydrocarbon group may also be a saturated fluorinated aliphatic hydrocarbon group or an unsaturated fluorinated aliphatic hydrocarbon group. Additionally, the aliphatic hydrocarbon group may be linear or branched. The fluorinated aliphatic hydrocarbon group may also be linear or branched.

It is preferred that each of $R_6$ to $R_8$, the aliphatic hydrocarbon group or the fluorinated aliphatic hydrocarbon group is a saturated linear or branched aliphatic hydrocarbon group, or a saturated linear or branched fluorinated aliphatic hydrocarbon group. In other words, it is preferred that each of $R_6$ to $R_8$ is a linear or branched alkyl or fluorinated alkyl group, and it is preferred that at least one of $R_6$ to $R_8$ is a fluorinated alkyl group.

In addition, the number of carbon atoms in each of $R_6$ to $R_8$, the aliphatic hydrocarbon group or the fluorinated aliphatic hydrocarbon group (preferably alkyl group or fluorinated alkyl group), each independently is preferably 1 or more and 4 or less, more preferably 1 or more and 3 or less. When the number of carbon atoms in the aliphatic hydrocarbon group or the fluorinated aliphatic hydrocarbon group is 4 or less, the increase in the viscosity of the electrolyte solution may be suppressed and the electrolyte solution may penetrate more readily into micropores in the electrodes and the separator, and the ionic conductivity may be enhanced and the current value may be better in the charge and discharge properties of the battery.

It is particularly preferred that each of $R_6$ to $R_8$ is a linear or branched alkyl group having a number of carbon atoms of 1 or more and 4 or less, more preferably 1 or more and 3 or less, or a linear or branched fluorinated alkyl group having a number of carbon atoms of 1 or more and 4 or less, more preferably 1 or more and 3 or less.

As described above, at least one of $R_6$ to $R_8$ is a fluorinated aliphatic hydrocarbon group, preferably a fluorinated alkyl group, and it is preferred that all of $R_6$ to $R_8$ are fluorinated aliphatic hydrocarbon groups, preferably fluorinated alkyl groups.

In addition, it is preferred that at least one of, preferably all of $R_6$ to $R_8$ is a fluorinated aliphatic hydrocarbon group in which 50% or more, more preferably 55% or more, of hydrogen atoms contained in the corresponding unsubstituted aliphatic hydrocarbon group are replaced with fluorine atom(s). When the content of fluorine atom is high, the withstand voltage property may be further improved, and the deterioration in the capacity of the battery after the cycles may be more reduced even in the case where a positive electrode active material which operates at a high electric potential is used.

Although it is preferred that each of $R_6$ to $R_8$ is an unsubstituted aliphatic hydrocarbon group or an unsubstituted fluorinated aliphatic hydrocarbon group, more preferably an unsubstituted saturated aliphatic hydrocarbon group or an unsubstituted saturated fluorinated aliphatic hydrocarbon group, $R_6$ to $R_8$ may have a substituent in addition to fluorine atom. Examples of the substituent include at least one selected from the group consisting of amino group, carboxy group, hydroxy group, cyano group, and halogen atoms (for example, chlorine atom, and bromine atom). In addition, the number of carbon atoms is the value including the substituent(s).

Examples of the fluorine-containing phosphate include 2,2,2-trifluoroethyldimethyl phosphate, bis(trifluoroethyl)methyl phosphate, bis(trifluoroethyl)ethyl phosphate, tris(trifluoromethyl)phosphate, pentafluoropropyldimethyl phosphate, heptafluorobutyldimethyl phosphate, trifluoroethylmethylethyl phosphate, pentafluoropropylmethylethyl phosphate, heptafluorobutylmethylethyl phosphate, trifluoroethylmethylpropyl phosphate, pentafluoropropylmethylpropyl phosphate, heptafluorobutylmethylpropyl phosphate, trifluoroethylmethylbutyl phosphate, pentafluoropropylmethylbutyl phosphate, heptafluorobutylmethylbutyl phosphate, trifluoroethyldiethyl phosphate, pentafluoropropyldiethyl phosphate, heptafluorobutyldiethyl phosphate, trifluoroethylethylpropyl phosphate, pentafluoropropylethylpropyl phosphate, heptafluorobutylethylpropyl phosphate, trifluoroethylethylbutyl phosphate, pentafluoropropylethylbutyl phosphate, heptafluorobutylethylbutyl phosphate, trifluoroethyldipropyl phosphate, pentafluoropropyldipropyl phosphate, heptafluorobutyldipropyl phosphate, trifluoroethylpropylbutyl phosphate, pentafluoropropylpropylbutyl phosphate, heptafluorobutylpropylbutyl phosphate, trifluoroethyldibutyl phosphate, pentafluoropropyldibutyl phosphate, heptafluorobutyldibutyl phosphate, tris(2,2,3,3-tetrafluoropropyl)phosphate, tris(2,2,3,3,3-pentafluoropropyl) phosphate, and tris(2,2,2-trifluoroethyl)phosphate (hereinafter, also abbreviated as PTTFE). Among them, tris(2,2,2-trifluoroethyl)phosphate (PTTFE), which is represented by the following formula (4), is preferred because the effect of suppressing the decomposition of the electrolyte solution at a high electric potential is high.

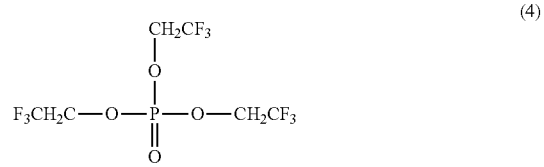

(4)

The content of the fluorinated phosphate represented by the formula (2) in the whole solvent may be preferably, but not limited to, 5 to 70 vol %.

In addition, the fluorinated phosphate represented by the formula (2) may be used singly or in combination of two or more.

It is preferred that the electrolyte solution of the embodiment further contains a fluorinated ether represented by the following formula (3) as the solvent.

$$R_{11}\text{—}O\text{—}R_{12} \qquad (3)$$

wherein $R_{11}$ and $R_{12}$ each independently represents alkyl group or fluorinated alkyl group, with the proviso that at least one of $R_{11}$ and $R_{12}$ is fluorinated alkyl group.

When the electrolyte solution contains the fluorinated ether, the viscosity of the electrolyte solution may be reduced and the conductivity of the electrolyte solution may be enhanced, while the resistance to oxidation of the electrolyte solution is maintained.

It is preferred that the total number of carbon atoms in $R_{11}$ and $R_{12}$, the alkyl group or the fluorinated alkyl group, is 10 or less. The alkyl group or the fluorinated alkyl group may be linear or branched. In addition, it is preferred that the fluorinated alkyl group is a fluorinated alkyl group in which 50% or more, more preferably 60% or more, of hydrogen atoms contained in the corresponding unsubstituted alkyl group are replaced with fluorine atom(s). When the content of fluorine atom is high, the withstand voltage property may be further improved, and the deterioration in the capacity of the battery after the cycles may be reduced more effectively even in the case where a positive electrode active material which operates at a high electric potential is used.

As the fluorinated ether, a compound represented by the following formula (5) is preferred.

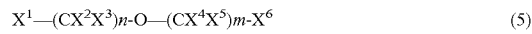

$$X^1-(CX^2X^3)n-O-(CX^4X^5)m-X^6 \quad (5)$$

wherein n and m each independently is 1 to 8, and $X^4$ to $X^6$ each independently is fluorine atom or hydrogen atom, with the proviso that at least one of $X^1$ to $X^3$ and $X^4$ to $X^6$ is fluorine atom.

From the standpoint of the withstand voltage property and the compatibility with other electrolytes, the fluorinated ether is more preferably a compound represented by the following formula (6).

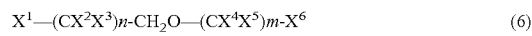

$$X^1-(CX^2X^3)n-CH_2O-(CX^4X^5)m-X^6 \quad (6)$$

wherein n is 1 to 7, m is 1 to 8, and $X^1$ to $X^6$ each independently is fluorine atom or hydrogen atom, with the proviso that at least one of $X^1$ to $X^3$ and $X^4$ to $X^6$ is fluorine atom.

Examples of the fluorinated ether compound include $CF_3OCH_3$, $CF_3OC_2H_6$, $F(CF_2)_2OCH_3$, $F(CF_2)_2OC_2H_5$, $CF_3(CF_2)CH_2O(CF_2)CF_3$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $(CF_3)(CF_2)CH_2O(CF_2)_2H$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $H(CHF)_2CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $CF_3CHFCF_2OCH_2(CF_2)_2F$, $CF_3CHFCF_2OCH_2CF_2CF_2H$, $H(CF_2)_4CH_2O(CF_2)_2H$, $CH_3CH_2O(CF_2)_4F$, and $F(CF_2)_4CH_2O(CF_2)_2H$.

The content of the fluorinated ether compound represented by the formula (3) in the whole solvent is preferably 10 vol % or more and 90 vol % or less, more preferably 20 vol % or more and 85 vol % or less. There is a tendency that when the content of the fluorinated ether compound is low, the viscosity of the electrolyte solution may be higher, and therefore the conductivity may be reduced and the capacity in the cycles may be reduced. Meanwhile, when the content of the fluorinated ether compound is high, the dielectric constant of the electrolyte solution may be lower, and therefore a supporting salt may not be dissociated and the capacity may be reduced similarly.

In addition, the fluorinated ether represented by the formula (3) may be used singly or in combination of two or more.

Examples of the other solvents which may be used in the electrolyte solution include aprotic solvents, including cyclic carbonates such as propylene carbonate (PC), ethylene carbonate (EC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); ethylene carbonate derivatives; propylene carbonate derivatives; and aliphatic carboxylates such as methyl formate, methyl acetate, and ethyl propionate. The aprotic solvent may be used singly or in combination of two or more.

It is preferred that the electrolyte solution of the embodiment further contains a carbonate compound as the solvent.

When the electrolyte solution contains a carbonate compound, the ionic dissociability of the electrolyte solution may be enhanced and the viscosity of the electrolyte solution may be reduced, and therefore the ionic mobility may be enhanced.

Examples of the carbonate compound include the cyclic carbonates and the chain carbonates as described above. Namely, examples of the carbonate compound include ethylene carbonate (EC), propylene carbonate (PC), butylene carbonate (BC), vinylene carbonate (VC), dimethyl carbonate (DMC), diethyl carbonate (DEC), ethyl methyl carbonate (EMC), and dipropyl carbonate (DPC). In addition, examples thereof also include fluorine-substituted carbonate compounds such as 4-fluoroethylene carbonate (FEC).

The content of the carbonate compound in the whole solvent is preferably 1 to 50 vol %, more preferably 5 to 40 vol %.

In addition to the above-described solvents, examples of the solvent include aprotic organic solvents, including γ-lactones such as γ-butyrolactone, chain ethers such as 1,2-ethoxy ethane (DEE) and ethoxy methoxy ethane (EME), cyclic ethers such as tetrahydrofuran and 2-methyltetrahydrofuran, dimethyl sulfoxide, 1,3-dioxolane, formamide, acetoamide, dimethylformamide, dioxolane, acetonitrile, propylnitrile, nitromethane, ethyl monoglyme, phosphoric acid triesters, trimethoxy methane, dioxolane derivatives, sulfolane, methyl sulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, N-methylpyrrolidone, and fluorinated carboxylates. The solvent may be used singly or in combination of two or more.

Examples of the lithium salt (supporting salt) to be dissolved in the electrolyte solution include, but not limited to, $LiPF_6$, $LiAsF_6$, $LiAlCl_4$, $LiClO_4$, $LiBF_4$, $LiSbF_6$, $LiCF_3SO_3$, $LiC_4F_9CO_3$, $LiC(CF_3SO_2)_3$, $LiN(CF_3SO_2)_2$, $LiN(C_2F_5SO_2)_2$, $LiB_{10}Cl_{10}$, lithium salts of lower aliphatic carboxylic acids, chloroborane lithium, lithium tetraphenylborate, LiCl, LiBr, LiI, and LiSCN.

The concentration of the lithium salt in the electrolyte solution is preferably 0.5 to 1.5 mol/l. When the concentration of the lithium salt is within the range, the density, the viscosity, the electric conductivity, and the like may be easily adjusted to the appropriate ranges.

[Positive Electrode]

In the embodiment of the invention, the positive electrode active material is not particularly limited, provided that the material is capable of intercalating lithium ions during charging and deintercalating lithium ions during discharging, and any of known materials may be used.

Examples of the positive electrode active material include lithium manganates having layered structure or lithium manganates having spinel structure such as $LiMnO_2$ and $Li_xMn_2O_4$ (0<x<2); $LiCoO_2$ and $LiNiO_2$, or compounds in which a part of the transition metal therein is replaced with another metal; lithium-transition metal oxides in which a certain transition metal does not exceed half of the total transition metals such as $LiNi_{1/3}Co_{1/3}Mn_{1/3}O_2$; compounds having olivine structure such as $LiFePO_4$; and compounds in which Li is contained in an amount of more than the stoichiometric composition in these lithium-transition metal oxides. Among them, $Li\alpha Ni\beta Co\gamma Al\delta O_2$ (1≤α≤1.2, α+β+γ+δ=2, β≥0.7, and γ≤0.2) or $Li\alpha Ni\beta Co\gamma Mn\delta O_2$ (1≤α≤1.2, α+β+γ+δ=2, β≥0.6, and γ≤0.2) is preferred. The materials may be used singly or in combination of two or more.

In addition, it is preferred that the positive electrode has a charge and discharge region of 4.5 V or more relative to lithium, and it is preferred that the positive electrode active material is capable of intercalating and deintercalating lithium at 4.5 V or more in terms of the electric potential relative to a metallic lithium counter electrode, and it is more preferred that a lithium-containing composite oxide, which has a plateau in the region of 4.5 V or more in terms of the electric potential relative to a metallic lithium counter electrode, is used. The effect of the embodiment may be more achieved by the effect of suppressing the decomposition of the electrolyte solution at a high voltage.

As a positive electrode active material that operates at an electric potential of 4.5 V or more, a lithium manganese composite oxide represented by the following formula (7), for example, may be used.

$$Li_a(M_xMn_{2-x-y}Y_y)(O_{4-w}Z_w) \quad (7)$$

wherein $0.4 \leq x \leq 1.2$, $0 \leq y$, $x+y<2$, $0 \leq a \leq 1.2$, and $0 \leq w \leq 1$; M is at least one selected from the group consisting of Co, Ni, Fe, Cr, and Cu; Y is at least one selected from the group consisting of Li, B, Na, Mg, Al, Ti, Si, K, and Ca; and Z is at least one of F or Cl.

Specific and preferred examples of the lithium manganese composite oxide represented by the formula (7) include $LiNi_{0.5}Mn_{1.5}O_4$, $LiCrMnO_4$, $LiFeMnO_4$, $LiCoMnO_4$, and $LiCu_{0.5}Mn_{1.5}O_4$. These positive electrode active materials have a high capacity.

From the standpoint of the achievement of sufficient capacity and longer lifetime, the positive electrode active material that operates at an electric potential of 4.5 V or more is more preferably a lithium manganese composite oxide represented by the following formula (7-1).

$$LiNi_xMn_{2-x-y}A_yO_4 \quad (7-1)$$

wherein $0.4<x<0.6$, $0 \leq y<0.3$, and A is at least one selected from Li, B, Na, Mg, Al, Ti and Si.

Examples of the olivine type positive electrode active material include a compound represented by the following formula (8). Among them, $LiCoPO_4$, $LiNiPO_4$, and the like are preferred.

$$LiMPO_4 \quad (8)$$

wherein M is at least one selected from the group consisting of Co and Ni.

Examples of the positive electrode active material that operates at an electric potential of 4.5 V or more also include Si composite oxides such as a compound represented by the following formula (10).

$$Li_2MSiO_4 \quad (10)$$

wherein M is at least one selected from the group consisting of Mn, Fe, and Co.

In addition, examples of the positive electrode active material that operates at an electric potential of 4.5 V or more include compounds having layered structure, and examples of the positive electrode active material having layered structure include a compound represented by the following formula (9).

$$Li(Li_xM_{1-x-z}Mn_z)O_2 \quad (9)$$

wherein $0 \leq x<0.3$, $0.3 \leq z \leq 0.7$, and M is at least one selected from the group consisting of Co, Ni, and Fe.

The positive electrode may be formed by, for example, applying a positive electrode slurry, which is prepared by mixing the positive electrode active material, a conductivity-imparting agent and a positive electrode binder, on a current collector.

Examples of the conductivity-imparting agent include carbon materials such as acetylene black, carbon black, fibrous carbon and graphite, metal substances such as Al, and powders of conductive oxides.

The positive electrode binder is not particularly limited, and, for example, polyvinylidene fluoride (PVdF), vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, and polyamideimide may be used.

The content of the conductivity-imparting agent in the positive electrode may be 1 to 10 mass %, for example. Meanwhile, the content of the binder in the positive electrode may be 1 to 10 mass %, for example. When the contents are within the ranges, the sufficient quantitative ratio of the active material in the electrode may be easily secured, and the sufficient capacity per unit mass may be easily achieved.

The positive electrode current collector is not particularly limited, and from the standpoint of the electrochemical stability, aluminum, nickel, copper, silver, and alloys thereof are preferred. Examples of the shape include foil, plate, and mesh.

[Negative Electrode]

The negative electrode active material is not particularly limited, provided that the material is capable of intercalating and deintercalating lithium ions, and any of known materials may be used. Specific examples of the negative electrode active material include carbon materials such as graphite, coke, and hard carbon; lithium alloys such as lithium-aluminum alloy, lithium-lead alloy, and lithium-tin alloy; lithium metal; Si; and metal oxides having an electric potential lower than the positive electrode active material such as $SnO_2$, SnO, $TiO_2$, and $Nb_2O_3SiO$.

The negative electrode may be formed by, for example, applying a negative electrode slurry, which is prepared by mixing the negative electrode active material, a conductivity-imparting agent and a negative electrode binder, on a negative electrode current collector.

Examples of the conductivity-imparting agent include carbon materials, and powders of conductive oxides.

The negative electrode binder is not particularly limited, and, for example, polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide, and polyacrylic acid may be used. Among them, polyimide and polyamideimide are preferred because they have strong binding properties.

From the standpoint of the "sufficient binding force" and the "higher energy" which are in a trade-off relation, the amount of the negative electrode binder to be used is preferably 5 to 25 parts by mass relative to 100 parts by mass of the negative electrode active material.

The negative electrode current collector is not particularly limited, and from the standpoint of the electrochemical stability, aluminum, nickel, stainless steel, chromium, copper, silver, and alloys thereof are preferred. Examples of the shape include foil, plate, and mesh.

Examples of the method for forming a negative electrode active material layer include a doctor blade method, a die coating method, a CVD method, and a sputtering method. Alternatively, a negative electrode active material layer may be formed in advance, and then a thin film of aluminum, nickel, or an alloy thereof may be formed by vapor deposition, sputtering, or the like, to provide a negative electrode.

[Separator]

The separator is not particularly limited, and any of known separators may be used. Specifically, a micro-porous film of polyolefin such as polyethylene and polypropylene, cellulose, and a material containing glass fiber, for example, may be used as the separator.

[Exterior Package]

Any exterior package may be appropriately selected and used, provided that it is stable to the electrolyte solution and has adequate water-vapor barrier properties. In the case of a stacked laminate type secondary battery, a laminate film such as an aluminum- or silica-coated polypropylene or polyethylene may be used as the exterior package, for example. From the standpoint of the reduction in the volume expansion, an aluminum laminate film may be particularly preferably used.

[Secondary Battery]

The secondary battery may have a configuration, for example, in which a positive electrode containing a positive electrode active material, a negative electrode containing a negative electrode active material, a separator as an insulator placed between the positive electrode and the negative electrode, and an electrolyte solution having lithium ion conductivity are sealed in an exterior package. When a voltage is applied between the positive electrode and the negative electrode, the positive electrode active material deintercalates lithium ions and the negative electrode active material intercalates lithium ions, and thereby the battery is in a state of charge. In a state of discharge, the battery is in a state reverse to the state of charge.

Examples of the shape of the battery include cylindrical shape, square shape, coin type, button type, and laminate type. Examples of the exterior package of the battery include stainless steel, iron, aluminum, titanium, and alloys thereof or plated products thereof. As the plating, nickel plating, for example, may be used.

For example, the secondary battery may be produced by, in a dry air or inert gas atmosphere, housing a laminate in which a negative electrode and a positive electrode are laminated with a separator therebetween, or alternatively, a product obtained by winding the laminate in an exterior container such as a can case, then injecting an electrolyte solution into the exterior container, and then sealing the exterior container with a flexible film consisting of a laminate of a synthetic resin and a metal foil, or the like.

The configuration of the secondary battery is not particularly limited, and the secondary battery may have a configuration such as a wound type in which a positive electrode and a negative electrode facing to each other with a separator sandwiched therebetween are wound, and a laminated type in which they are laminated, for example.

As an example of the secondary battery, a laminate type secondary battery is illustrated in FIG. 1. The separator 5 is sandwiched between the positive electrode consisting of the positive electrode active material layer 1, which contains a positive electrode active material, and the positive electrode current collector 3 and the negative electrode consisting of the negative electrode active material layer 2 and the negative electrode current collector 4. The positive electrode current collector 3 is connected to the positive electrode lead terminal 8, and the negative electrode current collector 4 is connected to the negative electrode lead terminal 7. The exterior laminate 6 is used as the exterior package, and the inside of the secondary battery is filled with the electrolyte solution.

Examples of the laminate resin film to be used in the laminate type include aluminum, aluminum alloys, and titanium foil. Examples of the material for the thermally-welded portion of the metal laminated resin film include thermoplastic polymer materials such as polyethylene, polypropylene, and polyethylene terephthalate. In addition, each of the metal laminated resin layer and the metal foil layer is not limited to one layer, and may be two or more layers.

EXAMPLES

The Examples of the embodiment will be described below in detail, but the embodiment is not limited to the following Examples.

Example 1

(Preparation of Positive Electrode)

Firstly, powders of $MnO_2$, $NiO$, $Li_2CO_3$, and $TiO_2$ were used, and the powders were weighed out for the target composition ratio, and pulverized and mixed. And then, the mixed powder was calcined at 750° C. for 8 hours to prepare $LiNi_{0.5}Mn_{1.37}Ti_{0.13}O_4$. It was confirmed that the positive electrode active material had a nearly single-phase spinel structure. The prepared positive electrode active material and carbon black as a conductivity-imparting agent were mixed, and the mixture was dispersed in a solution in which polyvinylidene fluoride (PVDF) as a binder was dissolved in N-methylpyrrolidone, to prepare a positive electrode slurry. The mass ratio of the positive electrode active material, the conductivity-imparting agent, and the positive electrode binder was 91/5/4. The positive electrode slurry was uniformly applied on both surfaces of a current collector made of Al. And then, the positive electrode slurry was dried in vacuum for 12 hours, and the dried mixture was subjected to compression molding with a roll press apparatus, to prepare a positive electrode.

(Preparation of Negative Electrode)

Graphite as a negative electrode active material was dispersed in a solution in which polyvinylidene fluoride (PVDF) as a binder was dissolved in N-methylpyrrolidone, to prepare a negative electrode slurry. The mass ratio of the negative electrode active material, and the negative electrode binder was 90/10. The negative electrode slurry was uniformly applied on both surfaces of a Cu current collector. And then, the negative electrode slurry was dried in vacuum for 12 hours, and the dried mixture was subjected to compression molding with a roll press apparatus, to prepare a negative electrode.

(Electrolyte Solution)

Tris(2,2,2-trifluoroethyl)phosphate (PTTFE), a dimeric phosphate represented by the following formula (A), a fluorinated ether (FE1) represented by $H(CF_2)_2CH_2O(CF_2)_2H$, and ethylene carbonate (EC) were mixed so that the ratio was 1.9:0.1:5:3 (volume ratio), to prepare a solvent. Then $LiPF_6$ was added to the solvent so that the concentration of $LiPF_6$ was 1M, to prepare an electrolyte solution.

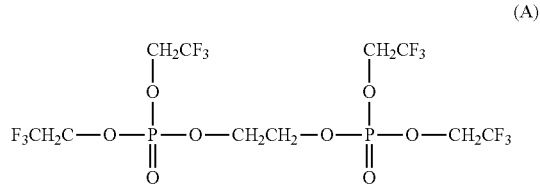

(A)

(Preparation of Laminate Type Battery) The positive electrode and the negative electrode were cut into a size of 1.5 cm×3 cm. The five resulting positive electrode layers and the six resulting negative electrode layers were alternately stacked, together with a polypropylene porous film as a separator sandwiched between the positive electrode and the negative electrode. The ends of the positive electrode current collectors, which were not covered with the positive electrode active material, were welded together, and the ends of the negative electrode current collectors, which were not covered with the negative electrode active material, were welded together. A positive electrode terminal made of aluminum, and a negative electrode terminal made of nickel were further welded to the welded parts, respectively, to provide an electrode element having a planar stacked structure. The electrode element was packed with an aluminum laminate film as an exterior package, and the electrolyte solution was poured into the exterior package, and then the exterior package was sealed while the pressure was reduced, to provide a secondary battery.

Examples 2 to 13 and Comparative Examples 1 to 3

Secondary batteries were prepared in the same manner as in Example 1 except that the compositions of the solvents of the electrolyte solutions were changed to the compositions as shown in Table 1. The composition ratio (a/b/c/d) in Table 1 is expressed as a volume ratio. Additionally, the abbreviations in Table 1 for compounds other than the above-described compounds are as follows.
PTM: trimethyl phosphate
PC: propylene carbonate
FEC: 4-fluoroethylene carbonate
DMC: dimethyl carbonate
(Cycle Test at High Temperature)
The cycle characteristics at a high temperature were evaluated for the secondary batteries prepared as described above. A cycle, in which the battery was charged to 4.8 V at 1 C, and then charged at a constant voltage for 2.5 hours in total, and then the battery was discharged to 3.0 V at a constant current of 1 C, was repeated 500 times at 45° C. The ratio of the discharge capacity after 500 cycles to the first discharge capacity was determined as the capacity retention ratio.

(Evaluation of Gas Generation)
The gas generation amount was evaluated by the determination of the change in the cell volume after the above-described charge and discharge cycle. The cell volume was measured by Archimedes method, and the gas generation amount was calculated by determining the difference between the cell volumes before and after the charge and discharge cycle.

The capacity retention ratio and the volume increase ratio (gas generation amount) after 500 cycles at 45° C. in Examples 1 to 13 and Comparative Examples 1 to 3 are shown in Table 1. As demonstrated in Comparative Examples 1 to 3, the capacity retention ratio was low and the volume increase was great in the case of an electrolyte solution containing either the fluorinated phosphate compound or the dimeric phosphate compound only. On the other hand, as demonstrated in Examples 1 to 16, it was found that in the cycle at a high temperature of 45° C., the capacity retention ratio was improved and the volume increase associated with the gas generation was reduced in the case where an electrolyte solution containing both the fluorinated phosphate compound and the dimeric phosphate compound was used.

Additionally, from the comparison between Examples 8 and 9 and other Examples, it was demonstrated that although the gas generation was reduced by the use of the mixed solvent of the fluorinated phosphate compound and the dimeric phosphate compound, the capacity retention ratio was further improved and the gas generation was further reduced, and therefore a battery having better properties was obtained when the solvent further contained the fluorinated ether compound.

TABLE 1

| | Solvent in non-aqueous electrolyte solution | | | | | 45° C., 500 cycle | |
| --- | --- | --- | --- | --- | --- | --- | --- |
| | Phosphate compound (a) | Dimeric phosphate compound (b) | Fluorinated ether compound (c) | Carbonate compound (d) | a/b/c/d | Capacity retention ratio (%) | Gas generation amount (cc) |
| Example 1 | PTTFE | (A) | FE1 | EC | 1.9/0.1/5/3 | 58 | 0.21 |
| Example 2 | PTTFE | (A) | FE1 | EC | 1.7/0.3/5/3 | 61 | 0.19 |
| Example 3 | PTTFE | (A) | FE1 | EC | 3.7/0.3/3/3 | 59 | 0.16 |
| Example 4 | PTTFE | (A) | FE1 | EC | 3.5/0.5/3/3 | 57 | 0.15 |
| Example 5 | PTTFE | (A) | FE1 | EC | 4.5/0.5/2/3 | 56 | 0.14 |
| Example 6 | PTTFE | (A) | FE1 | EC | 4/1/2/3 | 54 | 0.15 |
| Example 7 | PTTFE | (A) | FE1 | EC | 3/2/2/3 | 50 | 0.16 |
| Example 8 | PTTFE | (A) | — | EC | 6.7/0.3/0/3 | 48 | 0.28 |
| Example 9 | PTTFE | (A) | — | PC | 6.7/0.3/0/3 | 51 | 0.23 |
| Example 10 | PTTFE | (A) | FE1 | EC/FEC = 2/1 | 1.7/0.3/5/3 | 63 | 0.26 |
| Example 11 | PTTFE | (A) | FE1 | EC/PC = 2/1 | 1.7/0.3/5/3 | 63 | 0.24 |
| Example 12 | PTTFE | (A) | FE1 | EC/DMC = 2/1 | 1.7/0.3/5/3 | 65 | 0.29 |
| Example 13 | PTTFE | (A) | FE1 | PC | 1.7/0.3/5/3 | 59 | 0.18 |
| Comparative Example 1 | PTTFE | — | FE1 | EC | 2/0/5/3 | 46 | 0.55 |
| Comparative Example 2 | PTM | (A) | FE1 | EC | 2/0.3/5/2.7 | 27 | 0.46 |
| Comparative Example 3 | — | (A) | FE1 | EC/DMC = 2/1 | 0/0.3/3.7/6 | 44 | 0.82 |

Examples 14 to 18

Secondary batteries were prepared and the evaluations were conducted in the same manner as in Example 1 except that the compositions of the solvents of the electrolyte solutions were changed to the compositions as shown in Table 2, using the dimeric phosphate compounds represented by the formula (A), and the following formulas (B), (C), and (D). The results are shown in Table 2. The composition ratio (a/b/c/d) in Table 2 is expressed as a volume ratio.

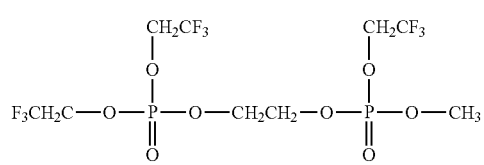

(B)

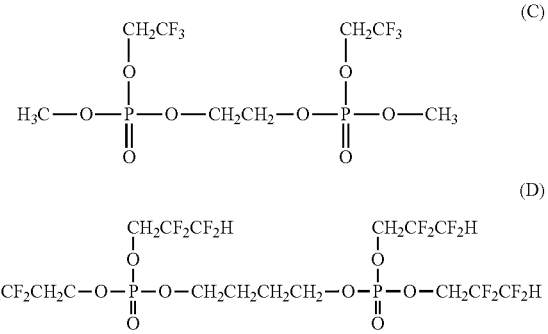

As in Examples 14 to 18, the good cycle characteristic and the effect of reducing the gas generation were achieved when the kind of the dimeric phosphate compound was changed or when two or more kinds of dimeric phosphate compounds were mixed.

TABLE 2

| | | Solvent in non-aqueous electrolyte solution | | | | 45° C., 500 cycle | |
|---|---|---|---|---|---|---|---|
| | Phosphate compound (a) | Dimeric phosphate compound (b) | Fluorinated ether compound (c) | Carbonate compound (d) | a/b/c/d | Capacity retention ratio (%) | Gas generation amount (cc) |
| Example 14 | PTTFE | (B) | FE1 | EC | 1.7/0.3/5/3 | 60 | 0.22 |
| Example 15 | PTTFE | (C) | FE1 | EC | 1.7/0.3/5/3 | 61 | 0.25 |
| Example 16 | PTTFE | (D) | FE1 | EC | 1.7/0.3/5/3 | 58 | 0.20 |
| Example 17 | PTTFE | (A)/(B) = 1/1 | FE1 | EC | 1.7/0.3/5/3 | 62 | 0.19 |
| Example 18 | PTTFE | (A)/(B)/(C) = 1/1/1 | FE1 | EC | 1.7/0.3/5/3 | 61 | 0.23 |

Examples 19 to 21

Secondary batteries were prepared and the evaluations were conducted in the same manner as in Example 1 except that the compositions of the solvents of the electrolyte solutions were changed to the compositions as shown in Table 3. The results are shown in Table 3. The composition ratio (a/b/c/d) in Table 3 is expressed as a volume ratio. Additionally, the abbreviations in Table 3 for compounds other than the above-described compounds are as follows.

PTTFP: tris(2,2,3,3-tetrafluoropropyl)phosphate
PTPFP: tris(2,2,3,3,3-pentafluoropropyl)phosphate As in Examples 19 to 21, the good cycle characteristic and the effect of reducing the gas generation were achieved when the kind of the fluorinated phosphate compound was changed.

TABLE 3

| | | Solvent in non-aqueous electrolyte solution | | | | 45° C., 500 cycle | |
|---|---|---|---|---|---|---|---|
| | Phosphate compound (a) | Dimeric phosphate compound (b) | Fluorinated ether compound (c) | Carbonate compound (d) | a/b/c/d | Capacity retention ratio (%) | Gas generation amount (cc) |
| Example 19 | PTTFP | (A) | FE1 | EC | 1.7/0.3/5/3 | 58 | 0.24 |
| Example 20 | PTTFP | (D) | FE1 | EC | 1.7/0.3/5/3 | 59 | 0.21 |
| Example 21 | PTPFP | (A) | FE1 | EC | 1.7/0.3/5/3 | 56 | 0.25 |

Examples 22 to 27

Secondary batteries were prepared and the evaluations were conducted in the same manner as in Example 1 except that the compositions of the solvents of the electrolyte solutions were changed to the compositions as shown in Table 4. The results are shown in Table 4. The composition ratio (a/b/c/d) in Table 4 is expressed as a volume ratio. Additionally, the abbreviations in Table 4 for compounds other than the above-described compounds are as follows.

FE2; $CF_3CHFCF_2OCH_2(CF_2)_2H$
(1H,1H,2'H,3H-Decafluorodipropyl ether)
FE3; $CF_3CHFCF_2OCH_2(CF_2)_2F$
(1H,1H,2'H-Perfluorodipropyl ether)
FE4; $H(CF_2)_4CH_2O(CF_2)_2H$
(1H,1H,5H-Perfluoropentyl-1,1,2,2-tetrafluoroethyl ether)
FE5; $CF_3CHFCF_2CH_2OCF_2H$
(2,2,3,4,4,4-hexafluorobuthyl-difluoromethyl ether)
FE6; $H(CF_2)_2OCH_2(CF_2)_2F$
(2,2,3,3,3-pentafluoropropyl-1,1,2,2-tetrafluoroethyl ether)
FE7; $CH_3CH_2O(CF_2)_4F$
(Ethyl nonafluorobutyl ether)

As in Examples 22 to 27, the good cycle characteristic and the effect of reducing the gas generation were achieved when the kind of the fluorinated ether compound was changed.

TABLE 4

| | Solvent in non-aqueous electrolyte solution | | | | | 45° C., 500 cycle | |
|---|---|---|---|---|---|---|---|
| | Phosphate compound (a) | Dimeric phosphate compound (b) | Fluorinated ether compound (c) | Carbonate compound (d) | a/b/c/d | Capacity retention ratio (%) | Gas generation amount (cc) |
| Example 22 | PTTFE | (A) | FE2 | EC | 1.7/0.3/5/3 | 57 | 0.24 |
| Example 23 | PTTFE | (A) | FE3 | EC | 1.7/0.3/5/3 | 58 | 0.22 |
| Example 24 | PTTFE | (A) | FE4 | EC | 1.7/0.3/5/3 | 54 | 0.19 |
| Example 25 | PTTFE | (A) | FE5 | EC | 1.7/0.3/5/3 | 57 | 0.20 |
| Example 26 | PTTFE | (A) | FE6 | EC | 1.7/0.3/5/3 | 55 | 0.20 |
| Example 27 | PTTFE | (A) | FE7 | EC | 1.7/0.3/5/3 | 56 | 0.28 |

As described above, a lithium secondary battery having improved lifetime property and reduced gas generation may be obtained by adopting the constitution according to the embodiment.

INDUSTRIAL APPLICABILITY

The embodiment of the invention may be used, for example, in any industrial field where power supply is needed, and in industrial fields related to transport, storage, and supply of electric energy. More specifically, the secondary battery may be used for power sources for mobile devices such as cellular phone and notebook computer; power sources for transfer/transport vehicles including electrically-powered vehicles such as electric vehicle, hybrid vehicle, electric motorcycle and power-assisted bicycle, electric train, satellite, and submarine; backup power sources such as UPS; power storage system to store electric power generated by solar power generation, wind power generation, or the like; and the like.

REFERENCE SIGNS LIST

1 Positive electrode active material layer
2 Negative electrode active material layer
3 Positive electrode current collector
4 Negative electrode current collector
5 Separator
6 Exterior laminate
7 Negative electrode lead terminal
8 Positive electrode lead terminal

The invention claimed is:
1. A lithium secondary battery, comprising
a positive electrode;
a negative electrode; and
a non-aqueous electrolyte solution, containing a lithium salt and a non-aqueous solvent,
wherein the non-aqueous electrolyte solution further contains
a phosphate polymer represented by the following formula (1):

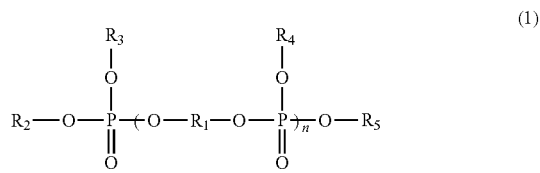

wherein $R_1$ to $R_5$ each independently represents aliphatic hydrocarbon group or fluorinated aliphatic hydrocarbon group, wherein the group may have at least one substituent selected from the group consisting of amino group, carboxy group, hydroxy group, cyano group, and halogen atoms, the number of carbon atoms in $R_1$ is 1 to 6, the number of carbon atoms in each of $R_2$ to $R_5$, each independently is 1 to 4, and n represents an integer of 1 to 4, with the proviso that when n is 2 or more, two or more $R_1(s)$ may be the same as, or different from each other and two or more $R_4(s)$ may be the same as, or different from each other; and
a fluorinated phosphate represented by the following formula (2):

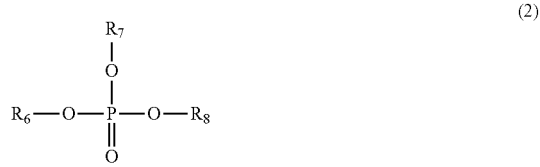

wherein $R_6$ to $R_8$ each independently represents aliphatic hydrocarbon group or fluorinated aliphatic hydrocarbon group, wherein the group may have at least one substituent selected from the group consisting of amino group, carboxy group, hydroxy group, cyano group, and halogen atoms, and the number of carbon atoms in each of $R_6$ to $R_8$, each independently is 1 to 4, with the proviso that at least one of $R_6$ to $R_8$ is fluorinated aliphatic hydrocarbon group, and wherein the content of the phosphate polymer represented by the formula (1) in the solvent is 0.1 to 15 vol %, and the content of the fluorinated phosphate represented by the formula (2) in the solvent is 5 to 70 vol %.

2. The lithium secondary battery according to claim 1, wherein $R_1$ in the formula (1) is alkylene group or fluorinated alkylene group and $R_2$ to $R_5$ in the formula (1) each independently is alkyl group or fluorinated alkyl group.

3. The lithium secondary battery according to claim 1, wherein at least one of $R_2$ to $R_5$ in the formula (1) is fluorinated alkyl group.

4. The lithium secondary battery according to claim 3, wherein at least one of $R_2$ to $R_5$ in the formula (1) is fluorinated alkyl group in which 50% or more of hydrogen atoms contained in the corresponding unsubstituted alkyl group are replaced with fluorine atom(s).

5. The lithium secondary battery according to claim 1, wherein n in the formula (1) is 1.

6. The lithium secondary battery according to claim 1, wherein $R_6$ to $R_8$ in the formula (2) each independently is alkyl group or fluorinated alkyl group, with the proviso that at least one of $R_6$ to $R_8$ is fluorinated alkyl group.

7. The lithium secondary battery according to claim 6, wherein at least one of $R_6$ to $R_8$ in the formula (2) is fluorinated alkyl group in which 50% or more of hydrogen atoms contained in the corresponding unsubstituted alkyl group are replaced with fluorine atom(s).

8. The lithium secondary battery according to claim 1, wherein the non-aqueous electrolyte solution contains a fluorinated ether solvent represented by the following formula (3) in an amount of 10 to 90 vol % of the solvent:

$$R_{11}-O-R_{12} \qquad (3)$$

wherein $R_{11}$ and $R_{12}$ each independently represents alkyl group or fluorinated alkyl group, and the number of carbon atoms of $R_{11}$ and $R_{12}$ each independently is 1 to 8, with the proviso that at least one of $R_{11}$ and $R_{12}$ is fluorinated alkyl group.

9. The lithium secondary battery according to claim 1, wherein the non-aqueous electrolyte solution contains a carbonate solvent in an amount of 1 to 50 vol % of the solvent.

10. The lithium secondary battery according to claim 1, wherein the positive electrode active material comprises a lithium manganese composite oxide represented by the following formula (7):

$$Li_a(M_xMn_{2-x-y}Y_y)(O_{4-w}Z_w) \qquad (7)$$

wherein $0.4 \leq x \leq 1.2$, $0 \leq y$, $x+y<2$, $0 \leq a \leq 1.2$, and $0 \leq w \leq 1$; M is at least one selected from the group consisting of Co, Ni, Fe, Cr, and Cu; Y is at least one selected from the group consisting of Li, B, Na, Mg, Al, Ti, Si, K, and Ca; and Z is at least one of F or Cl.

11. The lithium secondary battery according to claim 10, wherein the positive electrode active material comprises a lithium manganese composite oxide represented by the following formula (7-1):

$$LiNi_xMn_{2-y}A_yO_4 \qquad (7-1)$$

wherein $0.4<x<0.6$, $0 \leq y<0.3$, and A is at least one selected from Li, B, Na, Mg, Al, Ti and Si.

12. The lithium secondary battery according to claim 1, wherein the positive electrode active material comprises a lithium-metal composite oxide represented by the following formula (8):

$$LiMPO_4 \qquad (8)$$

wherein M is at least one selected from the group consisting of Co and Ni, a lithium-metal composite oxide represented by the following formula (9):

$$Li(Li_xM_{1-x-z}Mn_z)O_2 \qquad (9)$$

wherein $0 \leq x<0.3$, $0.3 \leq z \leq 0.7$, and M is at least one selected from the group consisting of Co, Ni, and Fe, or a Si composite oxide represented by the following formula (10):

$$Li_2MSiO_4 \qquad (10)$$

wherein M is at least one selected from the group consisting of Mn, Fe, and Co.

* * * * *